3,098,016
PROCESS FOR PRODUCING STERILE VIALS CONTAINING CULTURE MEDIA AND A CARBON DIOXIDE ATMOSPHERE

Murray Sam Cooper, Dumont, N.J., and Vito Anthony Di Benedetto, Pearl River, N.Y., assignors to American Cyanamid Company, New York, N.Y., a corporation of Maine
No Drawing. Filed July 26, 1961, Ser. No. 126,878
6 Claims. (Cl. 195—102)

This invention relates to an improved process for making devices suitable for the cultivation of fastidious microorganisms. More particularly, the present invention relates to an improvement for the production of sealed sterile vials containing a sterile culture medium in an atmosphere suitable for the cultivation of the fastidious microorganisms.

A serious problem is presented when it is desired to culture certain microorganisms such as those belonging to the genera Neisseria, Clostridium and Brucella. One of the fields of use is in the testing of blood samples for the possible presence of the microorganisms in question. Test outfits should be preferably in the form of small sterile vials containing a sterile culture medium and a suitable atmosphere. The microorganisms in question require for optimum growth an atmosphere which is comparatively high in carbon dioxide, for example, one approximating 10%. In the past such vials have been produced by the introduction of gaseous carbon dioxide. A typical method is that described in the Carski Patent No. 2,706,702. As the carbon dioxide has to be introduced after sterilization precise gas measuring becomes essential and the process is therefore expensive and sometimes does not produce accurate environments.

The present invention introduces into the culture medium constituents which react chemically to produce the desired carbon-dioxide atmosphere after capping of the vial and sterilization. As a result the vials contain a sterile medium with a sterile carbon dioxide atmosphere above the medium containing approximately 10% $CO_2$. At first glance this seems a relatively simple procedure. However, the ordinary methods of producing carbon dioxide by chemical reaction do not operate satisfactorily. Thus, for example, if an acid and a bicarbonate are added the reaction begins immediately, carbon dioxide is evolved prior to capping of the vial, and no accurate atmosphere is obtained. Also, the chemicals used must withstand addition to a culture medium at 50° C. without reaction or decomposition, they must withstand autoclaving after sealing at a pressure of 15 pounds p.s.i. without decomposing, they must not be bacteriostatic or bactericidal and after reaction the final product must have a pH between 6.8 and 7.5. The additives and their reaction products must also be completely soluble and disappear without leaving a trace of visible contaminants.

These stringent requirements have for practical purposes limited the reactants to citric acid and a bicarbonate such as sodium bicarbonate. However, when it is attempted to add these constituents reaction starts immediately. If they are incapsulated in mixtures satisfactory results are not obtained and in general the method of producing a carbon dioxide atmosphere of the desired concentration has not proved to be feasible, and thus it has been standard practice to introduce the carbon dioxide after sterilization as has been described above.

According to the present invention it has been found that if the correct amount of citric acid is added to the culture medium and then just before capping a tablet of a bicarbonate, such as sodium bicarbonate, compacted and formulated to dissolve slowly is added there is no significant evolution of carbon dioxide for the five to ten minutes which are required for capping and sealing the container. Thereupon reaction slowly takes place, finally producing the desired carbon dioxide atmosphere and leaving behind only a citrate which not only is harmless and has the right pH, but is also useful and performs the additional function of preventing or minimizing clot formation when the sealed vials are used for blood sample culturing. The vials all have the same atmospheric content, the production is rapid, and the product is uniform and reliable.

While a specific example will be described it should be understood that the amounts of citric acid and the bicarbonate will vary depending on the free space above the liquid in the vial and on the size of the vial. The amounts of citric acid and bicarbonate should be approximately stoichiometrical but are not critical, small excesses of either citric acid or sodium bicarbonate do no harm so long as they are not present in sufficient amounts to change the pH of the medium from the preferred range of 6.8 to 7.5.

The invention will be described in greater detail in conjunction with a specific example.

Example

A conventional culture medium which may have the following composition:

|  | Percent |
|---|---|
| NZ Amine Type A | 2.0 |
| NaCl | 0.2 |
| Dextrose, U.S.P. | 0.1 |
| Para-aminobenzoic acid | 0.005 |
| $Na_2HPO_4.12H_2O$ | 0.2 |
| Sodium citrate | 0.1 |
| Distilled water to make 100.0%. | | is filled into a vial to a predetermined level. Citric acid is then introduced to create a concentration of approximately 34 to 35 milligrams of citric acid for 50 milliliters of medium. Then a tablet of 125 milligrams of sodium bicarbonate is added for each 50 milliliters medium in the vial. The reaction does not start immediately, there being a negligible evolution of carbon dioxide for from 5 to 10 minutes. After capping, sealing and autoclaving, which are effected in conventional manner, reaction starts and when complete an atmosphere of about 10% carbon dioxide is produced above the culture medium.

The tablets are prepared as follows, the formula being for 2,000 tablets:

| | |
|---|---|
| Sodium bicarbonate, U.S.P. grams | 250 |
| Syrup, U.S.P. (equivalent to 50 gms. of sugar after drying) milliliters | 59 |
| Polyethylene Glycol 6000 (2%) (Carbide & Carbon Chemical Co.) grams | 6 |

The bicarbonate is granulated with the syrup and screened through a No. 8 mesh screen. The material is dried for approximately 16 hours at 42° C. and the dry granulation passed through a No. 20 mesh screen. The polyethylene glycol 6000 is added to the granulation and blended by a suitable blending apparatus for 20 minutes. Tablets are formed by compression on any suitable machine using ¼-inch, deep concave punches. The tablet should have a diameter of 0.25 inch and a thickness of 0.150 to 0.153 inch and a minimum Strong-Cobb hardness of 20. The polyethylene glycol 6000 with a melting range of 58° to 62° C. plus the hardness of the tablet act as a sustaining agent for the release of the sodium bicarbonate.

The preparation of the slow release sodium bicarbonate tablet has been described precisely and such tablets will release the sodium bicarbonate at a rate such that there will be negligible evolution of from 5 to 10 minutes after introduction into the culture medium. It should be understood that the exact formulation of the tablet is not to be considered as a limitation of the present invention. It is given as an illustration of a typical formulation which gives optimum results. Any other formulation which will give a tablet having approximately the same rate of evolution of bicarbonate may be used. The present invention requires a bicarbonate tablet, the rate of solution of which is such that there will be negligible carbon dioxide formation for from 5 to 10 minutes. It is not, however, concerned with the details of the manufacture of such tablets, the manufacturing processes being well known, but it is necessary that they be controlled to produce tablets having the desired rate of solution.

We claim:

1. A process for the production of sealed sterile vials containing sterile culture medium which comprises incorporating in the culture medium in each vial an amount of citric acid which on reaction with a bicarbonate will produce a volume of carbon dioxide approximating 10% of the free space above the culture medium in the vial, adding a bicarbonate in the form of a delayed dissolving tablet, the rate of dissolution being such that there is negligible carbon dioxide production for from 5 to 10 minutes, the tablet containing materials which, except for reaction with the citric acid, will not decompose at autoclaving temperatures of 15 pounds per square inch, do not result in the production of bacteriostatic and bactericidal products and produce after reaction with citric acid a final product having a pH between 6.8 and 7.5, all constituents of the tablet and their reaction products being completely soluble in water, and capping, sealing and sterilizing the vials.

2. A process according to claim 1 in which the amount of citric acid approximates 35 milligrams per 50 milliliters of culture medium and the amount of sodium bicarbonate in the tablet approximates 125 milligrams per 50 milliliters of culture medium.

3. A process according to claim 1 in which the vial is allowed to remain uncapped for approximately three minutes.

4. A process according to claim 1 in which the tablet consists essentially of sodium bicarbonate, a binder and a solubility retarding material.

5. A process according to claim 4 in which the tablet binder is sucrose and the solubility retarding material is polyethylene glycol 6000.

6. A process according to claim 4 in which the tablet has a minimum Strong-Cobb hardness of 20.

References Cited in the file of this patent
UNITED STATES PATENTS

| | | |
|---|---|---|
| 2,603,569 | Alther et al. | July 15, 1952 |
| 2,706,702 | Carski | Apr. 19, 1955 |
| 2,984,543 | Smith et al. | May 16, 1961 |